3,322,716
FLAME RETARDANT COMPOSITIONS CONSISTING ESSENTIALLY OF A THERMOPLASTIC MATERIAL AND A PHOSPHINIC ACID
Harvey Gerald Klein and Helen Currier Gillham, Stamford, Conn., assignors to American Cyanamid Company, Stamford, Conn., a corporation of Maine
No Drawing. Filed Aug. 19, 1963, Ser. No. 303,156
12 Claims. (Cl. 260—45.7)

This invention relates to flame-retardant compositions. More particularly, this invention relates to flame-retardant compositions comprising thermoplastic polymers containing a flame-retarding amount of a phosphinic acid. Still more particularly, this invention relates to flame-retardant compositions comprising thermoplastic polymers containing a flame-retarding amount of a phosphinic acid having the formula (I)
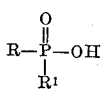

wherein R represents an aryl radical ($C_6$–$C_{10}$), an alkyl radical ($C_1$–$C_8$), or a cyano, hydroxy, carboxy, or carboxyhydroxy substituted alkyl radical, and $R^1$ represents hydrogen, an aryl radical ($C_6$–$C_{10}$), an alkyl radical ($C_1$–$C_8$), or a cyano, hydroxy, carboxy or carboxyhydroxy substituted alkyl radical.

The use of various materials incorporated into thermoplastic resins in order to improve the flame retardance thereof is known in the prior art. Many compounds are commercially available for such a use, among them being chlorostyrene copolymers, chlorinated paraffin wax with triphenyl stibine, chlorinated paraffins and aliphatic antimonyl compounds, as well as antimony oxide-chlorinated hydrocarbon mixtures. A drawback, however, of these compounds and mixtures of compounds has been the fact that generally a large amount, i.e. upwards of 35% of the additive must be incorporated into the resin in order to make it sufficiently flame retardant. Also these prior art additives tend to crystallize or oil out of the resin after a relatively short time of incorporation. We have now found a group of compounds which may be added to thermoplastic resins, in relatively small amounts, and still result in the production of satisfactory flame-retardant compositions which do not crystallize or oil out of the resin after incorporation therein.

The production of thermoplastic resin compositions which are flame-retardant, i.e. have high resistance to heat, is of considerable commercial importance. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall paneling, windows, etc., and items such as ash trays, waste baskets, fibers and the like are further examples of products wherein flame retardance is desirable.

It is therefore an object of the present invention to provide novel flame retardant thermoplastic resin compositions.

It is a further object of the present invention to provide flame retardant compositions comprising thermoplastic polymers and a flame-retarding amount of a phosphinic acid, such as those represented by Formula I.

These and further objects will become more apparent to those skilled in the art upon reading the more detailed description set forth hereinbelow.

The thermoplastic polymers

The thermoplastic polymers into which the flame retardant agents may be incorporated, either alone or in admixtures, to produce the novel compositions of the present invention, are generally the vinyl type polymers wherein the monomeric material is polymerized, by any known method, via the vinyl unsaturation therein. Additionally, thermoset type materials such as the polyester resins, polyurethanes, and the like may be used. Examples of the vinyl type polymers which may be used to form our novel compositions are the vinyl halides, the vinylidene halides, polyvinyl butyral, butadiene copolymers, acrylonitrile-butadiene-styrene polymers, the acrylonitriles, etc. Additionally and preferably, one may incorporate the flame retardant agents mentioned above into such polymers as the α-olefin polymers, such as the homopolymers and copolymers etc. containing, as the major constituent, ethylene, propylene, and the like and the acrylates and methacrylate polymers produced from monomers having the formula (II)
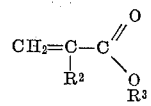

wherein $R^2$ is a hydrogen or methyl radical and $R^3$ is a hydrogen or an alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and their corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly, the allyl, methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl-styrene, alpha-methyl-para-methyl styrene, etc.; unsaturated ethers, e.g., ethyl vinyl ether, diallyl ether, etc.; unsaturated amides, for instance, N-allyl caprolactam, acrylamide, and N-substituted acrylamides, e.g., N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.

Other examples of monomers that can be used as polymers to form the resin portion of our novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to useful polymers, useful in the production of our novel flame-retardant compositions, are allyl methacrylate, diallyl carbonate, allyl lactate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexaallyl disiloxane, allyl diglycol carbonate, etc. Other examples of allyl compounds that may be employed are given, for example, in U.S. Patent No. 2,510,503 issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

*The phosphinic acids*

As mentioned above, we have discovered that the addition of phosphinic acids to a thermoplastic resin results in the production of resinous compositions having excellent flame-retardant properties. According to the present invention, any phosphinic acid, stable to processing conditions, may be used for this purpose. A preferred group of phosphinic acids, however, are those represented by Formula I, above. The phosphinic acids may be incorporated into the resins in flame-retarding amounts, i.e., generally amounts ranging from about 5%, by weight, to about 35%, by weight, preferably 10% to 25%, by weight, based on the weight of the polymer, have been found sufficient.

These phosphinic acids are generally known in the art and can be incorporated into the resin by any known method. That is to say, the flame-retardant phosphinic acid additive may be added to the resin by milling the resin and the acid on, for example, a two-roll mill, in a Banbury mixer etc., or the acid may be added by molding the acid and resin simultaneously, extruding the acid and resin or by merely blending the resin in powder form with the acid and thereafter forming the final desired article, i.e. by casting. Additionally, the phosphinic acid may also be added during the resin manufacture, i.e., during the monomer polymerization procedure, provided the catalyst etc. and other ingredients of the polymerization system are inert to the phosphinic acid. For example, the acid may be added to the monomer or a combination of the monomer and polymer and the mixture cast to form the final article.

The phosphinic acids set forth hereinabove may be produced in any known manner without varying from the scope of the present invention. Various methods for the production of phosphinic acids of this type are disclosed in, for example, a book by Kosolapoff, Organophosphorus Compounds, John Wiley & Sons, New York, N.Y., publishers, pp. 129 et seq., 1950, which is hereby incorporated herein by reference.

Generally, the procedure for the production of these phosphinic acids comprises reacting an excess of a compound of the formula

with hydrogen peroxide wherein R and $R^1$ are as defined above in regard to Formula I, under the following conditions: hydrogen peroxide slowly is added to an appropriate solvent (such as methanol) containing a suitable secondary phosphine while maintaining a gentle reflux. Excess peroxide is decomposed by boiling the solution with a small amount of charcoal, which is then filtered, and the solvent evaporated. The phosphinic acid, if a solid, is recrystallized from an appropriate solvent and isolated by filtration. If the phosphinic acid is a liquid, it is purified by distillation. Yields usually are from 50% to 90% of the theoretical, said procedures, however, forming no part of the present invention.

Examples of compounds which are represented by Formula I and are therefore useful in producing the novel compositions of the present invention include:

phenylphosphinic acid,
tolylphosphinic acid,
xylylphosphinic acid,
naphthylphosphinic acid,
methylphosphinic acid,
ethylphosphinic acid,
propylphosphinic acid,
n-butylphosphinic acid,
t-butylphosphinic acid,
isobutylphosphinic acid,
amylphosphinic acid,
hexylphosphinic acid,
cyclohexylphosphinic acid,
heptylphosphinic acid,
octylphosphinic acid,
cyclopentylphosphinic acid,
hydroxymethylphosphinic acid,
2-hydroxyethylphosphinic acid,
2-hydroxypropylphosphinic acid,
3-hydroxypropylphosphinic acid,
3-hydroxycyclopentylphosphinic acid,
4-hydroxybutylphosphinic acid,
2-hydroxybutylphosphinic acid,
1-hydroxybutylphosphinic acid,
2-hydroxycyclopentylphosphinic acid,
5-hydroxypentylphosphinic acid,
3-hydroxypentylphosphinic acid,
6-hydroxyhexylphosphinic acid,
4-hydroxyhexylphosphinic acid,
2-hydroxycyclohexylphosphinic acid,
1-hydroxyhexylphosphinic acid,
3-hydroxyheptylphosphinic acid,
2-hydroxyheptylphosphinic acid,
7-hydroxyheptylphosphinic acid,
5-hydroxyoctylphosphinic acid,
8-hydroxyoctylphosphinic acid,
1-hydroxyoctylphosphinic acid,
3-hydroxyoctylphosphinic acid,
cyanomethylphosphinic acid,
2-cyanoethylphosphinic acid,
3-cyanopropylphosphinic acid,
1-cyanopropylphosphinic acid,
2-cyanobutylphosphinic acid,
4-cyanobutylphosphinic acid,
5-cyanopentylphosphinic acid,
1-cyanopentylphosphinic acid,
3-cyanopentylphosphinic acid,
4-cyanohexylphosphinic acid,
6-cyanohexylphosphinic acid,
2-cyanohexylphosphinic acid,
7-cyanoheptylphosphinic acid,
5-cyanoheptylphosphinic acid,
2-cyanoheptylphosphinic acid,
8-cyanooctylphosphinic acid,
5-cyanooctylphosphinic acid,
1-cyanooctylphosphinic acid,
4-cyanooctylphosphinic acid,
1-carboxy-1-hydroxymethylphosphinic acid,
1-carboxy-1-hydroxyethylphosphinic acid,
2-carboxy-1-hydroxyethylphosphinic acid,
2-carboxy-2-hydroxyethylphosphinic acid,
1-carboxy-1-hydroxypropylphosphinic acid,
3-carboxy-1-hydroxypropylphosphinic acid,
6-carboxy-3-hydroxyhexylphosphinic acid, 6-carboxy-6-hydroxyhexylphosphinic acid,
1-carboxy-5-hydroxyhexylphosphinic acid,
8-carboxy-8-hydroxyoctylphosphinic acid,
8-carboxy-1-hydroxyoctylphosphinic acid,
6-carboxy-8-hydroxyoctylphosphinic acid,
carboxymethylphosphinic acid,
1-carboxyethylphosphinic acid,
2-carboxyethylphosphinic acid,
1-carboxypropylphosphinic acid,
2-carboxypropylphosphinic acid,
3-carboxypropylphosphinic acid,
4-carboxybutylphosphinic acid,
1-carboxybutylphosphinic acid,
5-carboxypentylphosphinic acid,
3-carboxypentylphosphinic acid,
6-carboxyhexylphosphinic acid,
7-carboxyheptylphosphinic acid,
8-carboxyoctylphosphinic acid,
5-carboxyoctylphosphinic acid,
1-carboxyoctylphosphinic acid,
diphenylphosphinic acid,
ditolylphosphinic acid,
dixylylphosphinic acid,
dinaphthylphosphinic acid,
dimethylphosphinic acid,
diethylphosphinic acid,
dipropylphosphinic acid,
di-n-butylphosphinic acid,
di-t-butylphosphinic acid,
diisobutylphosphinic acid,
diamylphosphinic acid,
dihexylphosphinic acid,
dicyclohexylphosphinic acid,
diheptylphosphinic acid,
dioctylphosphinic acid,
dicyclopentylphosphonic acid,
bis(hydroxymethyl)phosphinic acid,
bis(2-hydroxyethyl)phosphinic acid,
bis(2-hydroxypropyl)phosphinic acid,
bis(3-hydroxypropyl)phosphinic acid,
bis(3-hydroxycyanopentyl)phosphinic acid,
bis(4-hydroxybutyl)phosphinic acid,
bis(2-hydroxybutyl)phosphinic acid,
bis(1-hydroxybutyl)phosphinic acid,
bis(2-hydroxycyclopentyl)phosphinic acid,
bis(5-hydroxypentyl)phosphinic acid,
bis(3-hydroxypentyl)phosphinic acid,
bis(6-hydroxyhexyl)phosphinic acid,
bis(4-hydroxyhexyl)phosphinic acid,
bis(2-hydroxycyclohexyl)phosphinic acid,
bis(1-hydroxyhexyl)phosphinic acid,
bis(3-hydroxyheptyl)phosphinic acid,
bis(2-hydroxyheptyl)phosphinic acid,
bis(7-hydroxyheptyl)phosphinic acid,
bis(5-hydroxyoctyl)phosphinic acid,
bis(8-hydroxyoctyl)phosphinic acid,
bis(1-hydroxyoctyl)phosphinic acid,
bis(3-hydroxyoctyl)phosphinic acid,
bis(cyanomethyl)phosphinic acid,
bis(2-cyanoethyl)phosphinic acid,
bis(3-cyanopropyl)phosphinic acid,
bis(1-cyanopropyl)phosphinic acid,
bis(2-cyanobutyl)phosphinic acid,
bis(4-cyanobutyl)phosphinic acid,
bis(5-cyanopentyl)phosphinic acid,
bis(1-cyanopentyl)phosphinic acid,
bis(3-cyanopentyl)phosphinic acid,
bis(4-cyanohexyl)phosphinic acid,
bis(6-cyanohexyl)phosphinic acid,
bis(2-cyanohexyl)phosphinic acid,
bis(7-cyanoheptyl)phosphinic acid,
bis(5-cyanoheptyl)phosphinic acid,
bis(2-cyanoheptyl)phosphinic acid,
bis(8-cyanooctyl)phosphinic acid,
bis(1-carboxy-1-hydroxyethyl)phosphinic acid,
bis(2-carboxy-1-hydroxyethyl)phosphinic acid,
bis(2-carboxy-2-hydroxyethyl)phosphinic acid,
bis(1-carboxy-1-hydroxypropyl)phosphinic acid,
bis(3-carboxy-1-hydroxypropyl)phosphinic acid,
bis(6-carboxy-3-hydroxyhexyl)phosphinic acid,
bis(6-carboxy-6-hydroxyhexyl)phosphinic acid,
bis(1-carboxy-5-hydroxyhexyl)phosphinic acid,
bis(8-carboxy-8-hydroxyoctyl)phosphinic acid,
bis(8-carboxy-1-hydroxyoctyl)phosphinic acid,
bis(6-carboxy-8-hydroxyoctyl)phosphinic acid,
bis(carboxymethyl)phosphinic acid,
bis(1-carboxyethyl)phosphinic acid,
bis(2-carboxyethyl)phosphinic acid,
bis(1-carboxypropyl)phosphinic acid,
bis(2-carboxypropyl)phosphinic acid,
bis(3-carboxypropyl)phosphinic acid,
bis(4-carboxybutyl)phosphinic acid,
bis(1-carboxybutyl)phosphinic acid,
bis(5-carboxypentyl)phosphinic acid,
bis(3-carboxypentyl)phosphinic acid,
bis(6-carboxyhexyl)phosphinic acid,
bis(7-carboxyheptyl)phosphinic acid,
bis(8-carboxyoctyl)phosphinic acid,
bis(5-carboxyoctyl)phosphinic acid,
bis(1-carboxyoctyl)phosphinic acid,
1-cyanocyclopentylphosphinic acid,
3-cyanocyclopentylphosphinic acid,
2-carboxycyclopentylphosphinic acid,
4-carboxycyclohexylphosphinic acid,
3-cyanocyclohexylphosphinic acid,
bis(1-cyanocyclopentyl)phosphinic acid,
bis(3-cyanocyclopentyl)phosphinic acid,
bis(2-carboxycyclopentyl)phosphinic acid,
bis(4-carboxycyclohexyl)phosphinic acid,
bis(3-cyanocyclohexyl)phosphinic acid,
methylpropylphosphinic acid,
phenyltolylphosphinic acid,
hydroxymethylpropylphosphinic acid,
1-hydroxybutyl-2-hydroxycyclohexylphosphinic acid,
2-cyanoethylphenylphosphinic acid,
1-cyanocyclopentylmethylphosphinic acid,
1-carboxy-1-hydroxyethylnaphthylphosphinic acid,
3-hydroxybutyl-1-cyanoethylphosphinic acid,
1-carboxy-1-hydroxypropyltolylphosphinic acid,
hexylisobutylphosphinic acid,
4-cyanobutylcyanomethylphosphinic acid,
2-hydroxyethyl-1-hydroxyethylphosphinic acid,
methyl-3-hydroxybutylphosphinic acid,
2-carboxy-2-hydroxyethylphenylphosphinic acid,
cyclohexyl-1-cyanoethylphosphinic acid,
(3-hydroxycyclopentyl)phenylphosphinic acid,
(1-cyanoethyl)xylylphosphinic acid,
ethyl-n-butylphosphinic acid,
3-hydroxyoctyl-2-cyanocyclopentylphosphinic acid,
2-carboxy-1-hydroxyethyl-2-cyanoethylphosphinic acid,
and the like.

It is within the scope of the present invention to incorporate such ingredients as plasticizers, dyes, pigments, stabilizers, antioxidants, antistatic agents and the like to our novel compositions without detracting from the advantageous properties thereof.

The following examples are set forth for purposes of illustration only and are not to be construed as limitations on the present invention except as set forth in the appended claims. All parts and percentages are by weight unless otherwise specified.

Any appropriate flame retardance test may be used to determine the flame retardance properties of any specific compound. One test which is reasonably efficient is that designated as a modified version of ASTM test D-635-56T. The specifications for this test are: a specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1″ blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4″ mark, the specimen is designated as "self-exinguishing" or "flame-retardant."

EXAMPLE 1

Eighty parts of polyethylene and 20 parts of dicyclohexylphosphinic acid are milled together on a two roll mill at about 170° C. The resulting milled composition is molded into strips 5″ in length, 0.5″ in width and 0.45″ in thickness and said strips are then subjected to an art recognized flame-retardance test. The strips pass the test and are therefore designated as flame-retardant.

Following the procedure of Example 1, examples were carried out utilizing different flame retardant agents and various thermoplastic resin polymers. The results of these examples are set forth in Table I, below. In each instance the resultant plastic-phosphinic acid mixture passed the flame-retardance test and was designated as flame and fire retardant. In the table PE=polyethylene; PP=polypropylene; PMMA=poly(methyl methacrylate); PA= poly(acrylic acid); AN=acrylonitrile; ST=styrene and BD=butadiene.

TABLE I

| Example | Polymer | R | R¹ | Percent |
|---|---|---|---|---|
| 2 | PMMA | phenyl | H | 25 |
| 3 | PE | $C_4H_9$ | $C_4H_9$ | 25 |
| 4 | PE | phenyl | phenyl | 5 |
| 5 | PMMA | phenyl | phenyl | 15 |
| 6 | PE | phenyl | phenyl | 15 |
| 7 | PE | $OHCH_2-$ | $OHCH_2-$ | 25 |
| 8 | PMMA | $\underset{HO}{\overset{O}{\diagdown}}C-\underset{CH_3}{\overset{OH}{\mid}}C-$ | $\underset{HO}{\overset{O}{\diagdown}}C-\underset{CH_3}{\overset{OH}{\mid}}C-$ | 25 |
| 9 | PE | $NCCH_2CH_2$ | $NCCH_2CH_2$ | 25 |
| 10 | PE | $\underset{HO}{\overset{O}{\diagdown}}C-CH_2-CH_2-$ | $\underset{HO}{\overset{O}{\diagdown}}C-CH_2-CH_2-$ | 25 |
| 11 | PE | cyclopentyl | cyclopentyl-OH | 20 |
| 12 | PMMA | cyclopentyl | cyclopentyl-OH | 25 |
| 13 | PE | cyclopentyl-OH | cyclopentyl-OH | 25 |
| 14 | PA | $H_3C-$phenyl | H | 20 |
| 15 | PMMA | $H_3C-$phenyl$-CH_3$ | H | 25 |
| 16 | Mixture of BD-AN (10-75%)* and AN-ST (25-90%). | naphthyl | H | 25 |
| 17 | PP | naphthyl | naphthyl | 30 |
| 18 | PP | $CH_3$ | H | 20 |
| 19 | PE | $C_2H_5$ | H | 20 |

TABLE I—Continued

| Example | Polymer | R | R¹ | Percent |
|---|---|---|---|---|
| 20 | PMMA | $C_8H_{17}$ | H | 25 |
| 21 | MMA/ST/AN, 71/19/10 | $CH_3$ | $CH_3$ | 25 |
| 22 | PP | $C_2H_5-$ | $C_2H_5-$ | 20 |
| 23 | PE | $C_8H_{17}-$ | $C_8H_{17}-$ | 25 |
| 24 | PE | phenyl— | $C_8H_{17}-$ | 30 |
| 25 | PE | phenyl— | $H_3C-$phenyl— | 25 |
| 26 | PMMA | naphthyl— | $H_3C-$phenyl— | 30 |
| 27 | PP | $CNCH_2-$ | $CNCH_2-$ | 10 |
| 28 | PP | $CN(CH_2)_6-$ | H | 25 |
| 29 | PE | $CH_3CH_2CH-(CH_2)_5-$<br>$\quad\quad\quad\;\;\;\overset{|}{CN}$ | $CH_3$ | 20 |
| 30 | PMMA | $HOCH_2-$ | H | 15 |
| 31 | PA | $HO(CH_2)_4-$ | phenyl— | 25 |
| 32 | PE | $CH_3(CH_2)_2-CH-(CH_2)_4-$<br>$\quad\quad\quad\quad\;\;\overset{|}{OH}$ | H | 30 |
| 33 | PA | $\underset{HO}{\overset{O}{\|}}C-CH_2-$ | $H_3C-$phenyl— | 25 |
| 34 | Mixture of BD–AN (10–75%)* and AN–ST (25–90%). | $\underset{HO}{\overset{O}{\|}}C(CH_2)_7$ | $\underset{HO}{\overset{O}{\|}}C-(CH_2)_3-$ | 25 |
| 35 | PE | $\underset{HO}{\overset{O}{\|}}C-CH_2-CH-$<br>$\quad\quad\quad\quad\;\;\overset{|}{OH}$ | $C_2H_5$ | 25 |
| 36 | PMMA | $\underset{HO}{\overset{O}{\|}}C-CH_2-CH-$<br>$\quad\quad\quad\quad\;\;\overset{|}{OH}$ | H | 20 |
| 37 | PP | $\underset{HO}{\overset{O}{\|}}C-CH-(CH_2)_6$ | $NCCH_2CH_2$ | 25 |
| 38 | PE | cyclohexyl— | H | 30 |
| 39 | PMMA | phenyl— | cyclohexyl-OH | 10 |
| 40 | PMMA | phenyl— | phenyl— | 20 |
| 41 | PE | $CH_3$ | $CNCH_2-$ | 25 |
| 42 | PE | $H_3C-$phenyl$-CH_3$ | $\underset{HO}{\overset{O}{\|}}C-CH_2CH_2-$ | 30 |
| 43 | PP | $HOCH_2CH_2-$ | cyclohexyl-OH | 25 |

TABLE I—Continued

| Example | Polymer | R | R¹ | Percent |
|---|---|---|---|---|
| 44 | PE | $C_2H_5$ | 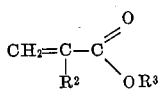 | 20 |
| 45 | PMMA | 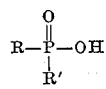 | 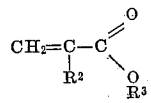 | 30 |

*U.S. Patent No. 2,439,202.

We claim:

1. A flame-retardant composition consisting essentially of a thermoplastic material selected from the group consisting of a polymer, and blends of polymers produced from at least one vinyl monomer selected from the group consisting of (1) a butadiene, (2) an acrylonitrile, (3) an α-olefin, (4) a styrene and (5) a compound having the formula $$CH_2=C-C\overset{O}{\underset{OR^3}{\diagdown}}$$
$$\phantom{CH_2=}R^2$$

wherein $R^2$ is selected from the group consisting of hydrogen and a methyl radical and $R^3$ is selected from the group consisting of hydrogen and an alkyl radical of from 1 to 6 carbon atoms, inclusive, and from about 5% to about 35%, by weight, based on the weight of said material, of a phosphinic acid having the formula $$R-\overset{O}{\underset{R'}{\overset{\|}{P}}}-OH$$

wherein R is selected from the group consisting of (a) an aryl radical containing from 6–10 carbon atoms, (b) an alkyl radical containing from 1–8 carbon atoms, and (c) a substituted alkyl radical containing from 1–8 carbon atoms and being substituted with a member selected from the group consisting of (I) cyano, (II) hydroxy, (III) carboxy and (IV) carboxy and hydroxy and R' is selected from the group consisting of (w) hydrogen, (x) said (a), (y) said (b), and (z) said (c).

2. A flame retardant composition according to claim 1 wherein the thermoplastic polymer is a polymer of an α-olefin.

3. A flame retardant composition according to claim 1 wherein the thermoplastic polymer is a polymer of a compound having the formula $$CH_2=C-C\overset{O}{\underset{\underset{R^3}{O}}{\diagdown}}$$
$$\phantom{CH_2=}R^2$$

wherein $R^2$ is selected from the group consisting of hydrogen and a methyl radical and $R^3$ is selected from the group consisting of hydrogen and an alkyl radical having from 1 to 6 carbon atoms, inclusive.

4. A flame retardant composition according to claim 1 wherein the thermoplastic polymer is poly(methyl methacrylate).

5. A flame retardant composition according to claim 1 wherein the thermoplastic polymer is a mixture of (A) a butadiene-acrylonitrile copolymer and (B) an acrylonitrile-styrene copolymer, the amount of A and B ranging from about 10–75% to 90–25%, respectively.

6. A flame retardant composition according to claim 1 wherein the thermoplastic polymer is polypropylene.

7. A flame retardant composition consisting essentially of polyethylene and from about 5% to about 35%, by weight, based on the weight of said polyethylene of dicyclohexylphosphinic acid.

8. A flame retardant composition consisting essentially of polyethylene and from about 5% to about 35%, by weight, based on the weight of said polyethylene of diphenylphosphinic acid.

9. A flame retardant composition consisting essentially of polyethylene and from about 5% to about 35%, by weight, based on the weight of said polyethylene of di-n-butylphosphinic acid.

10. A flame retardant composition consisting essentially of poly(methyl methacrylate) and from about 5% to about 35%, by weight, based on the weight of said poly(methyl methacrylate) of dicyclohexylphosphinic acid.

11. A flame retardant composition consisting essentially of poly(methyl methacrylate) and from about 5% to about 35%, by weight, based on the weight of said poly(methyl methacrylate) of bis(1-carboxy-1-hydroxyethyl)phosphinic acid.

12. A flame retardant composition consisting essentially of poly(methyl methacrylate) and from about 5% to about 35%, by weight, based on the weight of said poly(methyl methacrylate) of cyclopentyl-1-hydroxycyclopentylphosphinic acid.

References Cited

UNITED STATES PATENTS

| | | | |
|---|---|---|---|
| 2,230,371 | 2/1941 | Bolton | 260—45.7 |
| 2,370,903 | 3/1945 | Hirschmann | 260—500 |
| 2,516,980 | 8/1950 | Gray et al. | 260—45.7 |
| 2,773,046 | 12/1956 | Dunn et al. | 260—45.7 |
| 2,953,595 | 9/1960 | Rauhut et al. | 252—8.1 |
| 2,997,454 | 8/1961 | Leistner et al. | 260—45.75 |
| 3,014,954 | 12/1961 | Birum | 260—461 |
| 3,065,183 | 11/1962 | Temin | 252—78 |
| 3,078,248 | 2/1963 | Ben | 260—30.6 |
| 3,249,562 | 3/1966 | Schoepfle et al. | 260—2.5 |

FOREIGN PATENTS

| | | |
|---|---|---|
| 243,465 | 1/1961 | Australia. |
| 519,738 | 11/1953 | Belgium. |
| 526,531 | 6/1965 | Canada. |
| 1,044,813 | 11/1958 | Germany. |
| 866,042 | 4/1961 | Great Britain. |

OTHER REFERENCES

Modern Plastics Encyclopedia, vol. 40, No. 1A, September 1962, page 479 relied on.

Chemical Abstracts I, Subject Index, vol. 58, June 30, 1963, page 1662S.

Chemical Abstracts II, Subject Index, vol. 57, December 31, 1962, page 1863S.

DONALD E. CZAJA, *Primary Examiner.*

LEON J. BERCOVITZ, F. McKELVEY,
*Assistant Examiners.*